(12) United States Patent
Meixelsperger et al.

(10) Patent No.: US 6,866,073 B1
(45) Date of Patent: Mar. 15, 2005

(54) FORAGE BAG LOADING ASSEMBLY

(76) Inventors: James Martin Meixelsperger, E. 3760 Meixelsperger Rd., Plain, WI (US) 53577; Jared James Meixelsperger, E. 3760 Meixelsperger Rd., Plain, WI (US) 53577

( * ) Notice: Subject to any disclaimer, the term of this patent is extended or adjusted under 35 U.S.C. 154(b) by 22 days.

(21) Appl. No.: 10/408,638

(22) Filed: Apr. 7, 2003

(51) Int. Cl.[7] .............................. B65B 1/20; B65B 1/28; B65B 3/18; B65B 3/22
(52) U.S. Cl. ........................ 141/73; 141/10; 141/313; 141/314; 141/317; 56/344
(58) Field of Search ................ 141/10, 18, 67, 141/71, 73, 76, 313–317, 363, 365; 100/137, 142, 226; 56/341, 344, 350, 432

(56) References Cited

U.S. PATENT DOCUMENTS

| 68,101 A | 8/1867 | Mills |
|---|---|---|
| 3,687,061 A | 8/1972 | Eggenmuller et al. |
| 3,943,843 A * | 3/1976 | Steinberg et al. .............. 100/51 |
| 4,106,268 A | 8/1978 | White |
| 4,310,036 A * | 1/1982 | Rasmussen et al. ......... 141/114 |
| 4,337,805 A | 7/1982 | Johnson et al. |
| 4,724,876 A | 2/1988 | Ryan |
| 4,747,343 A | 5/1988 | St. Clair |

* cited by examiner

Primary Examiner—Timothy L. Maust
(74) Attorney, Agent, or Firm—Loyd W. Bonneville

(57) ABSTRACT

A forage loading assembly substitutes a large reciprocating piston for the traditionally employed auger to impel and compact the forage into a huge bag. The forage is preferably transferred to a point above the piston action by a conveyor, the bottom of which is suspended to avoid being dragging along the ground during widely recognized forward creeping assembly phenomenon.

1 Claim, 4 Drawing Sheets

FORAGE BAG LOADING ASSEMBLY

BACKGROUND OF THE INVENTION

FIELD OF THE INVENTION

Farm Equipment.

DESCRIPTION OF THE PRIOR ART

Occasionally a descriptive term in this application may be shortened so as to recite only a part rather than the entirety thereof as a matter of convenience or to avoid needless redundancy. In instances in which that is done, applicant intends that the same meaning be afforded each manner of expression. Thus, the term forage bin's loading opening (22) might be used in one Instance but in another, if meaning is otherwise clear from context, expression might be shortened to loading opening (22) or merely opening (22). Any of those forms is intended to convey the same meaning.

The term attach or fasten or any of their forms when so used means that the juncture is of a more or less permanent nature, such as might be accomplished by nails, screws, welds or adhesives. Thus it is stated herein that the forage bin's (21) connection to the peripheral frame assembly (1) is one of attachment, for which purpose bolts or a weld may be employed. A connection in which one object is easily removed from another is described by the word emplace, as where it is stated herein that the forage (200) is emplaced within the forage emplacement assembly (2)—typically a forage bin (21). A connection in which two objects, although not attached could be separated only with considerable difficulty is referred to herein as one of rigid emplacement. The binding of the forage bag (100) to the peripheral frame assembly (1) by bungee cords or other acceptable such means (24) is stated herein to be such a connection. Employment of the words connector join or any of their forms is intended to include the meaning of any of those terms in a more general way.

The word comprise may be construed in any one of three ways herein. A term used to describe a given object is said to comprise it, thereby characterizing it with what could be considered two-way equivalency in meaning for the term. Thus, it is stated that bag ties (101) often comprising elastic bungee cord type connectors may be employed to secure the forage bag (100) to the peripheral frame assembly (1). The term comprise may also be characterized by what might be considered one-way equivalency, as when it is stated herein that the power takeoff of a tractor or other piece of motorized farm machinery (430) comprises the empowered linkage (400) required for operation, meaning that in the given instance, that mechanism (430) is itself (430) the linkage (400). This use of the word has a generic sense to it. That is, the power takeoff (430) will always be empowered linkage (400) but such linkage (400) may be motorized equipment power takeoff (430) in one case but something else in another. However, the word comprise may also be used to describe a feature which is part of the structure or composition of a given object. Thus, the peripheral frame assembly (1) is stated to comprise, among other things, an entrance opening (13) as a component thereof. The meaning in the respective cases is clear from context, however. Accordingly, modifying words to clarify which of the three uses is the intended one seem unnecessary.

Terms relating to physical orientation such as top or bottom, upper or lower, refer to the manner the assembly would be observed positioned for operation in the field. This convention has been adopted as a matter of convenience in discussing orientation and as shown in the drawings, the forage (200) is preferably loaded into the bin (21) from above.

The term longitudinal refers to generally elongated configuration, herein the front to rear aspect of the assembly. Thus, a particular historical patent is observed to have provided two interfaced augers (603) disposed longitudinally in rotational opposition.

The word forage (100) as used herein refers to a host of farm materials, edible by farm stock or stored for other future purposes. Hay, corn, wheat and silage, feed or fodder in general are examples.

Certain words may have been coined herein to simplify discussion. In some cases, a noun may be converted to a verb or adjective. The term planular refers to the plane-like aspect of a given object's structure. The meanings of such terms are generally explained ante.

It seems that every farm task traditionally undertaken manually has now been adapted to one or another mechanized assembly. The collection of forage (200) is no exception. For more than a century, inventors hard at workaround the world have been creating gadgets to get it (200) from the field to storage without lifting a pitchfork.

The auger (603) proved the major center of attention in that connection. At an early date, U.S. Pat. No. 68,101 issued to Mills actually interfaced two of them (603) longitudinally in rotational opposition to both grind and deliver peat into a receptacle. An impressive list of innovative devices followed that lead, some addressing oil extraction from raw plant materials and others, sausage stuffing, dough kneading, churning and screw generated pumping in general. Examples culminating in forage bag (100) filling include U.S. Pat. No. 3,687,061 issued to Eggenmuller, eta/and U.S. Pat. No. 4,747,343 issued to St. Clair(U.S. Pat. No. 4,655,128 appearing to be cumulative thereof). These devices oriented the augers (603) longitudinally, depositing the forage (200) into the bag (100) at the rear.

In much a similar vein, rotational means—not truly an auger (603) but very like one (603)—was oriented transversely, still accomplishing the same purpose. These are, therefore, to be considered in the same light and include U.S. Pat. No. 4,337,805 issued to Johnson, et al(U.S. Pat. No. 4,308,901 issued to Lee and U.S. Pat. No. 4,310,036 issued to Rasmussen, et al appearing to be cumulative thereof) and U.S. Pat. 4,724,876 issued to Ryan.

There are more, but the screw or auger (603), while historically tantalizing, provides only tangential curiosity along these lines. Hay balers are probably closer to the point, since some of them force the material into designated shapes by means of piston-like mechanisms, albeit not of the reciprocating type as considered herein, ante. U.S. Pat. No. 4,106,268 issued to White, et al did employ a driving member much resembling in operation and appearance the reciprocating piston (31) which is the subject hereof but only the tail end of a fairly complex timed mechanical chain dedicated solely to baling.

Forage bag (100) loading assemblies have shared certain characteristics in common. Invariably, there has been a bin of some sort (601) with an opening (631) through which forage (200) loading has been accomplished. Some type of mechanism, typically an auger (603), supra, then moved the forage (200) into the interior of a horn (612) through an opening (631) therein (612). The horn (612) was most advantageously streamlined to facilitate the forage's (200) passage. Some configurations were even suggestive of a seashell, ever expanding toward its outlet. There (612), the pressure generated by the forage's (200) accumulation caused it (200) to follow the path of least resistance into the bag (100).

Anchoring of the bag (100) to the horn (612) was accomplished by bag ties (101)—often comprising elastic bungee cord type connectors either extending longitudinally from the bag's (100) end to the horn (612) or wrapped around its (100) mouth which overlapped the horn's (612) outlet. Nonetheless, it was also learned that the bag (100) need not be tightly fitted at the bottom but instead, permitted to hang limply there. In fact, some relief opening was found to advantageously avoid excessive fermentation pressure buildup within the bag (100). Accordingly, the horn (612), though preferably domed at the top, was often deliberately truncated in cross sectional design across the bottom.

It was observed almost from the first that as the long tunnel-like bag (100) filled, its (100) weight kept it (100) from moving along the ground. As a result, the loading equipment and any power providing farm machinery (430) present were observed to be gradually nudged forward. The hay wagon or other source of supply likewise had to be moved a little at a time to keep up. Without more, it was also unhappily observed, the forward inching of the equipment tended to prevent good compaction of the forage (200). The solution, it was learned, was to provide a sort of braking mechanism. Yet, forward movement altogether such as provided by a true brake had to be avoided. Ultimately, a torque opposition assembly (500), usually manually operable by hand lever to resist but not stop altogether a wheel's rotation, was developed. When filling was completed, the bag itself (100), despite its (100) rigid emplacement and even the bag ties (101), conveniently loosened from its (100) moorings, ready for sealing or other on-site treatment.

Early in development, it also became clear that it was advantageous to load the forage (200) into the bin then employed (601) from above, allowing it (200) to drop into place for the auger (603) to do its (603) work. In time, conveyors of one sort or another (650) were added to move the forage (200) from the ground, where it (200) was usually handled, to the bin (601). But then, means to keep the conveyor (650) from dragging on the ground because of the equipment's inching forward from the pressure exerted by the forage (200) from behind had to be provided. Pulley assemblies added to the conveyors (650), among other things, assisted in lateral accommodating adjustment.

The system, of course, required empowered linkage (400) of some sort. That was satisfactorily provided by a liquid fuel power generating engine (411)—one run on gasoline, for example. Although electric power generating engines (412) were also known, they were not generally employed because the work was generally undertaken in the field, away from electric plug-in power sources. What was observed, however, was that the power takeoff from a tractor or other piece of motorized farm machinery (430) could be used. The intervening linkage was either of the sprocket and chain assembly (421) sort or a direct drive assembly (422) featuring splines and related solid gearing connections.

It would be wise to include In a packing assembly many existing prior art features Including, for example, the torque opposition assembly (500), the gasoline powered (411) motorized farm vehicle (430) for power linkage (400), the bag ties (101) and the domed but bottom truncated cross-sectional configuration of the horn (612). It would be beneficial to provide innovative means, however, for the traditionally employed conveyor's (650) connection to the forage emplacement assembly (2) to avoid having it (650) drag along the ground while the system is inched forward because of posterior filling pressure as well as to adapt the rotational inertia of a flywheel (32), ante, to the system's empowered linkage (400). Most of all, however, it would be highly beneficial to provide a forage bag (100) loading assembly incorporating means less costly and lighter in weight than the traditional auger (603) to move the forage (200) from the site of its (200) introduction into the system to the bag (100), its (200) ultimate destination.

The needs and objectives pointed out supra thus far remain only partly addressed in the prior art. Some, such as those just immediately addressed, have not been met at all.

SUMMARY OF THE INVENTION

In its most important aspect, the invention comprises a substitution for the mechanism which, in a forage (200) loading operation, moves the forage (200) from an intermediate site toward, if not directly into, a forage bag (100). The traditional auger (603) is replaced by a reciprocating piston (31). The forage (200), thus, is moved and compressed not by a screwing action but rather, by being repetitiously hammered along the pathway. An optionally provided flywheel (32) facilitates efficient reciprocation.

A peripheral frame assembly (1) disposed between the piston (31) and the bag (100) comprises an entrance opening (13) through which the forage (200) is impelled by the piston (31). It (1) takes on any one of a number of forms ranging from planular (11) to a fully bell-shaped chute horn (12). The bag's (100) connection to the frame assembly (1) is preferably accomplished by known means such as bungee cords or other acceptable bag ties (101).

The forage (200) is deposited, preferably from above, by a conveyor (23), at an emplacement assembly (2) site through the opening (22) of a forage bin (21). Connection means (24) between the conveyor (23) and the bin (21), which include hanger hooks, wing nuts or the like, maintain the conveyor (23) in position and avoid its (23) contact with the ground so that it does not drag along as the assembly is urged forward because of a buildup in loading pressure within the bag (100) and frame assembly (1). A traditional torque opposition assembly (500), operated manually or otherwise, is preferably incorporated to provides braking means to control the forward pushing phenomenon.

The power train—herein designated an empowered linkage (400)—may comprise any means including a gasoline or electric engine (411, 412, respectively)—preferably the former (411) for field work—and intermediately, a sprocket and chain or direct drive assembly (421, 422, respectively). The more preferred empowered linkage (400) derives from the power takeoff of a tractor or other motorized farm equipment (430).

BRIEF DESCRIPTION OF THE DRAWINGS

Solid lines in the drawings represent the invention. Dashed lines represent either non-inventive material, that not incorporated into an inventive combination hereof and which may be the subject of another invention, or that which although so incorporated, lies beyond the focus of attention.

In FIG. 5, the power from a liquid fuel power generating engine (411)—a typical gasoline engine, for example—is transmitted through a sprocket and chain assembly (421). In FIG. 6, an electric power generating engine (412) is the power source (400), suggesting operation conveniently near a place to plug in for it (412), rather than in the field as it usually is. FIG. 7 illustrates the familiar use of tractor or other farm equipment power takeoff (430)—in this case, gasoline powered—as the power source (400).

DESCRIPTION OF THE PREFERRED EMBODIMENT

Figure 1:
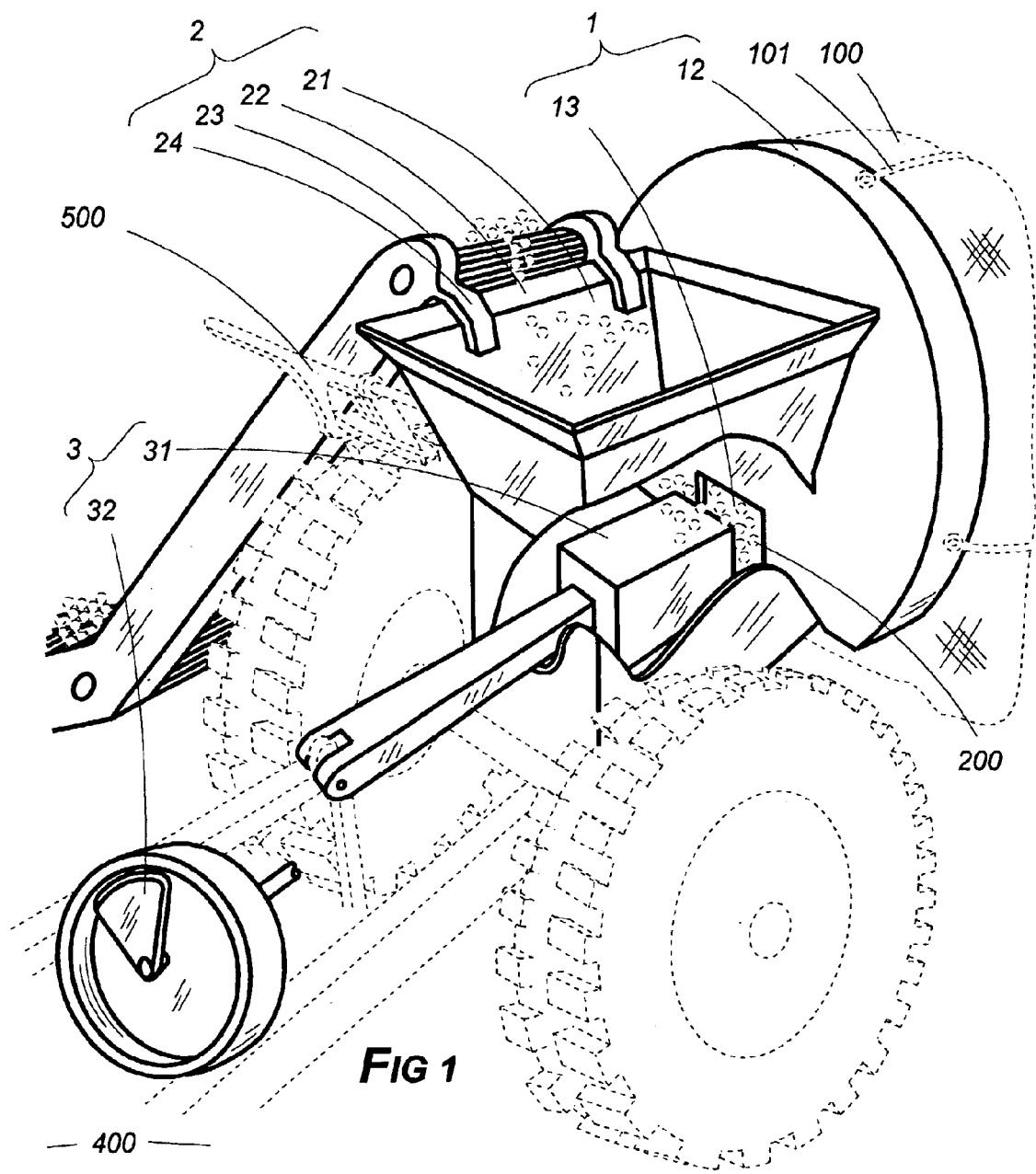
FIG. 1 is a perspective of the invention comprising a piston assembly (3) which includes both the reciprocating piston (21) and a flywheel (32). The piston (21) is shown about half way through its (21) cycle and some of the forage (100) is shown to have been impelled from the forage bin (21) into the chute horn (12). The embodiment illustrated includes a conveyor (23) for delivery of the forage (200) into the bin (21). At this early filling stage, the bag (100) is very nearly empty, hanging limply from the horn's (12) delivery end.
Figure 2:
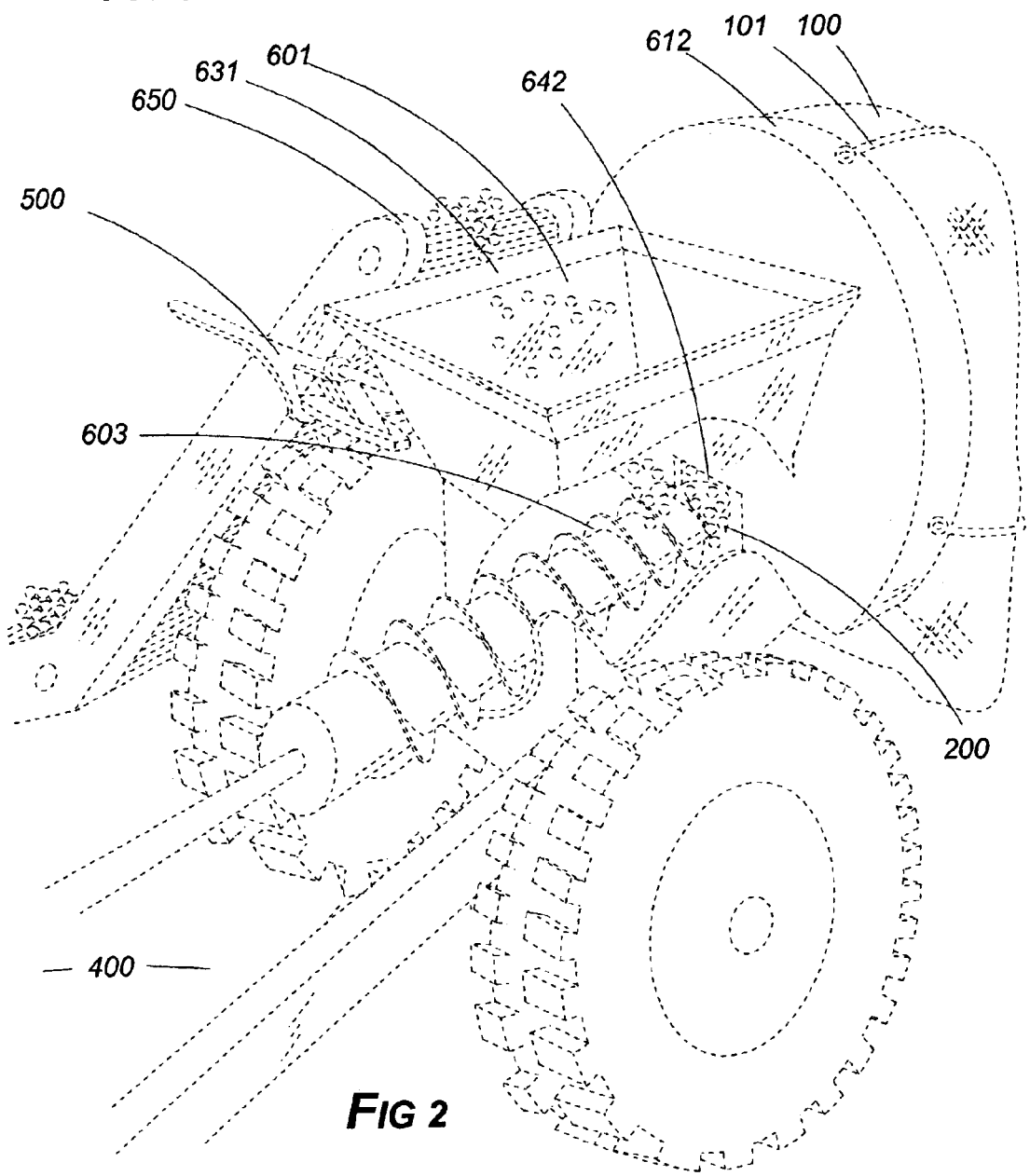
FIG. 2 represents a prior art version of a bag (100) loading assembly in which a large auger (603) is operated to deliver the forage (200) through a typical horn (612) into the bag (100). Other prior art features are also apparent including the loading bin (601), the forage delivery opening (642) to the horn (612) and the conveyor (650).
Figure 3:
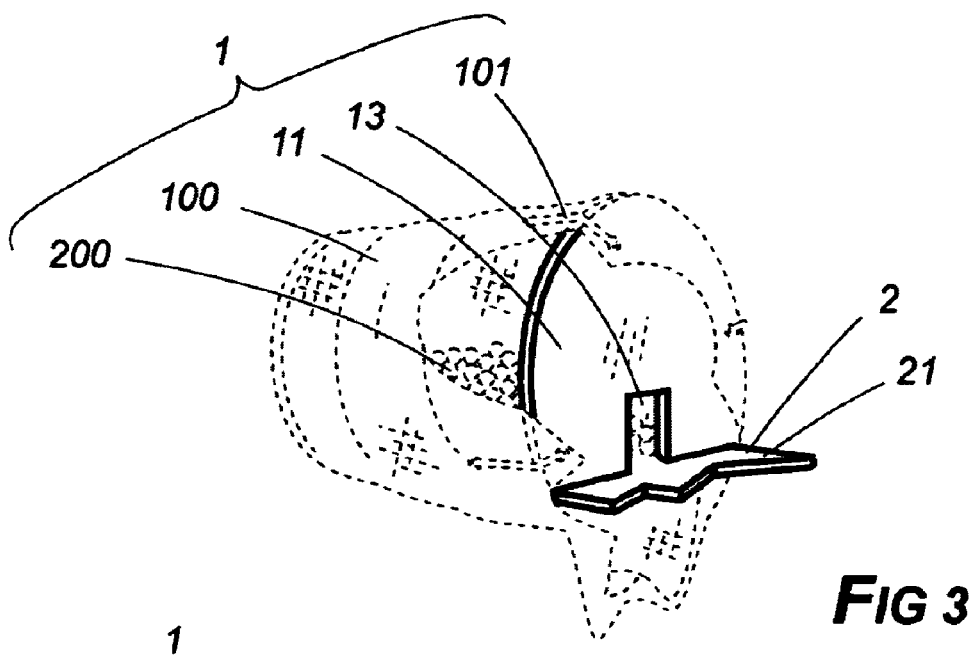
FIGS. 3 and 4 are perspective cut-away views of two forms of peripheral frame assembly (1), the former comprising a planular frame (11), the latter, a chute horn (12) with a considerably deepened interior to facilitate forage (200) flow. In both of these instances, the frame assembly (1) is truncated, allowing, if desired, a loose opening for the bag (100) at the bottom. A small portion of the forage bin (21) is included in both drawings.
Figure 4:
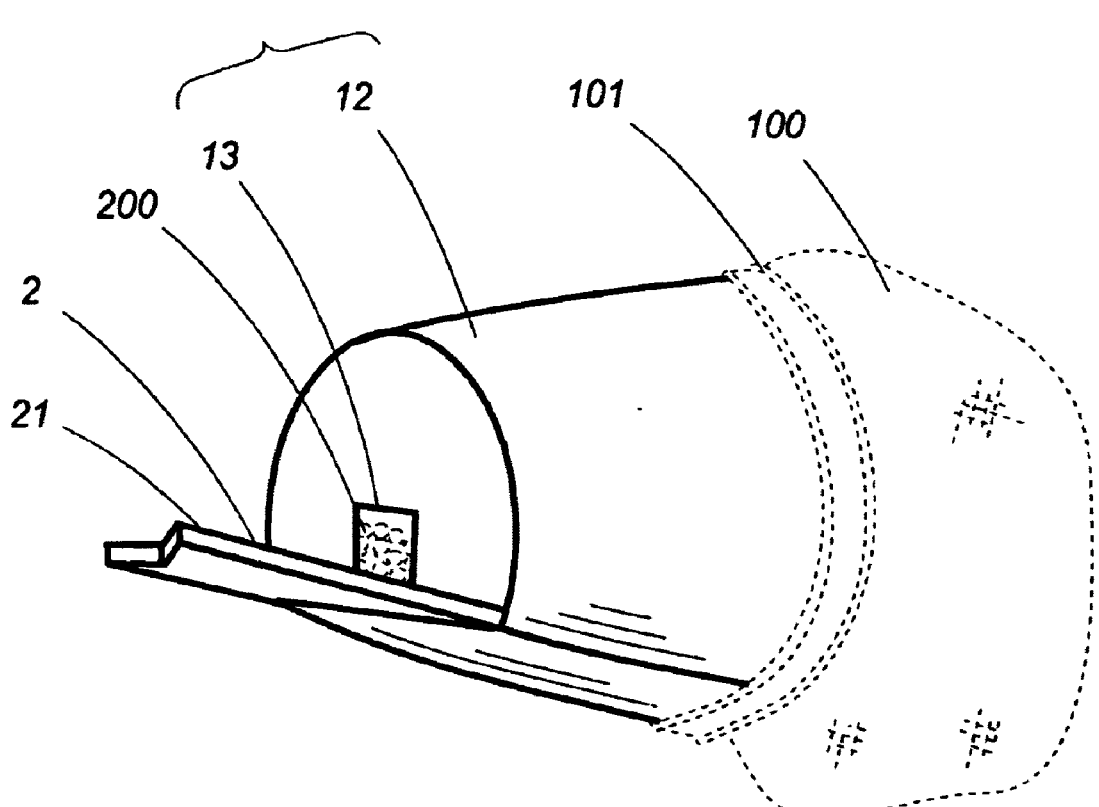
Figure 5:
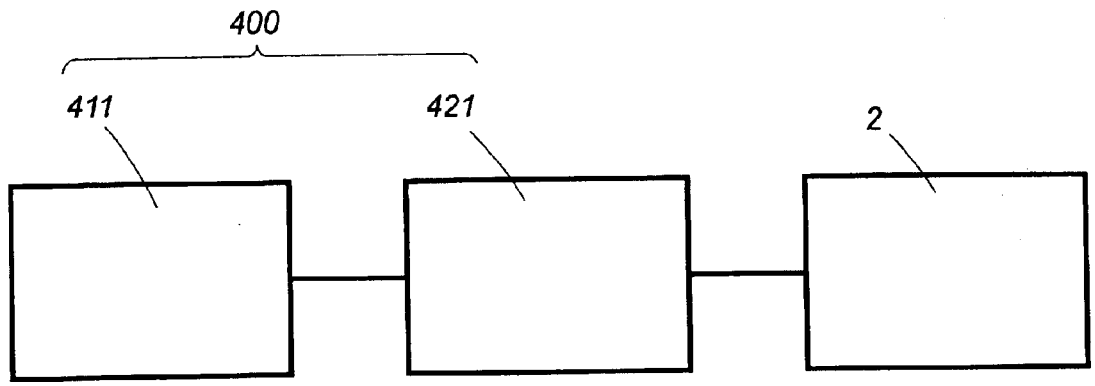
FIGS. 5–7 constitute symbolic representations of empowered linkage (400) hookups for the invention.
Figure 6:
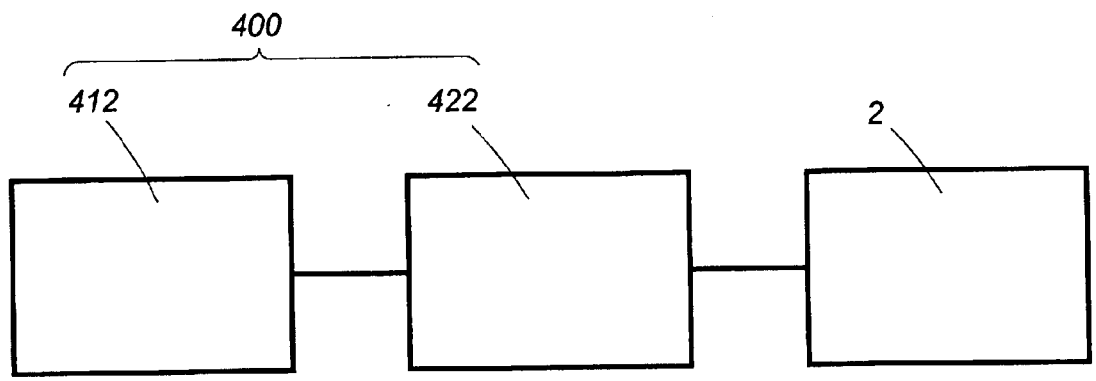
Figure 7:
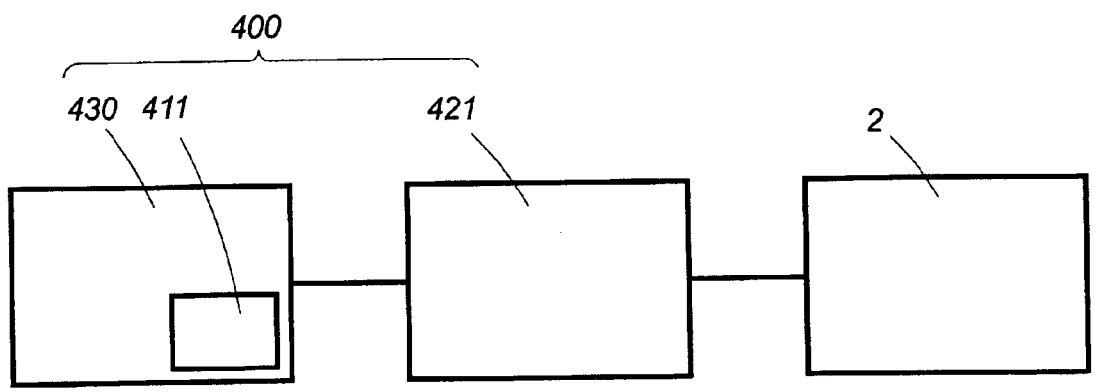

The subject hereof comprises a forage bag (100) loading assembly operably enabled by an empowered linkage (400) and comprising a peripheral frame assembly (1), a forage emplacement assembly (2) and piston assembly (3). In preferred embodiments, a conveyor (23) is also present.

The peripheral frame assembly (1) may comprise little more than a planular frame (11), a vertically disposed planular structure. A more sophisticated frame (1) includes a chute horn (12), comprising a bell of curved, expanding configuration to better accommodate forage (200) flow and tight packing. The circumference of either (11, 12) accommodate the bag's (100) emplacement with the aid of typical ties (101). It is accordingly stated herein that the frame assembly (1) is configured and disposed for enclosure by rigid emplacement of a forage bag's mouth around it (1). The circumference of the planular structure (11)—or the rearmost outlet portion of the chute horn (12), if that embodiment (12) is present (11, 12)—preferably defines a circle or oval, although the design may be truncated to allow the bag (100) to hang freely open at the bottom, supra.

The peripheral frame (1) comprises an entrance opening (13) large enough to permit the passage of bulk forage (200). To avoid clogging or jamming, supra, the assembly's intermittent action, ante, impels the forage (200) through the opening (13) in what might figuratively be termed bite—sized increments. Where the frame (1) comprises naught but planular configuration (11) or even one of slight curvature, forage (200) shot through the opening (12) lodges within the bag itself (100). Where the frame (1) takes on the more deepened configuration of the chute horn (12), however, the forage (200) comes first to rest within the horn (12) and thereafter, is compressed and urged into the bag (100) by that (200) following from behind.

The bag (100) is connected to the frame (1) by what is defined herein as means of rigid emplacement. One acceptable means thereof comprises what are referred to in general herein as one or more bag ties (101), such as the familiar bungee cords either hooked at various points or wrapped around the bag's (100) connection site to the frame (1).

A piston assembly (3) drives the forage (200) through the frame's entrance opening (12). It (3) comprises a reciprocating piston (31) and, preferably, a flywheel (32), whose inertial energy of rotation boosts the intermittent action. The forage (200) is impelled in repetitive ramming action by the forward stroke of the piston (31), optionally hollowed out to conserve weight. Preferably, its (31) impelling portion—the head—is configured in a blunted or flattened manner—the piston's (31) cross-section approximating the shape of the entrance opening (12). Thus, if the opening (12) is rectangular, as is commonly the case, its (31) axial cross-section should also be so shaped, albeit of slightly smaller dimension so that, as is preferable, it (31) penetrates smoothly through the opening (12) during its (31) forward stroke.

The forage emplacement assembly (2) comprises a forage bin (21) and a loading opening (22) situated for convenient admission of forage (200) into it (21) from the outside. The bin (21), attached to the peripheral frame assembly (1) by bolts, welds or other suitable means, is disposed in communication with the peripheral frame's entrance opening (13)—that is, is positioned such that any contents therein (21) may pass through the opening (13) Into the frame (1). It is a matter of little consequence how the forage (200) is made to arrive at its (200) Intended site in the path of the piston's (31) forward stroke. Most conveniently, it (200) is dropped into place from above within the bin (21). As at prior art, the loading opening (21) is, therefore, preferably located at the top of the emplacement assembly (2). Where such is the case, it is convenient that the forage emplacement assembly additionally comprise, as was frequently done at prior art, a conveyor (23) as the means by which the forage (200) is delivered to the loading opening (22). Connection means (24) of the conveyor (23) to the forage bin (21), such as hooked hangers, wing nuts or other appropriate fasteners, avoid having it (23) drag along the ground as the loading gear is urged forward upon bag (100) filling, supra.

Empowered linkage (400) necessary for the invention's operation may be any of several mechanisms known to the art, supra. Preferably, the gasoline driven (411) power takeoff of a tractor or other piece of motorized farm machinery (430) comprises the required linkage (400). A direct drive assembly (422) is also linkage preferred as linkage (400) over a sprocket and chain assembly (421), although that (421), too, is a feasible alternative. While it is generally considered the bagging will be conducted in the field, an electric power generating engine (412) would permit operation at a site where electricity can be tapped into.

What is claimed is:

1. A forage bag loading assembly comprising
   a peripheral frame assembly configured and disposed for enclosure by rigid emplacement of a forage bag's mouth around it and comprising an entrance opening of size permitting the passage of bulk forage increments;
   a forage emplacement assembly comprising a forage bin disposed in communication with the frame's entrance opening and comprising a loading opening of size permitting the passage of bulk forage increments into the bin;
   a piston assembly comprising a reciprocating piston disposed to impel with its forward stroke the bulk forage increments through the entrance opening thereof;

an empowered linkage disposed to drive the reciprocating piston;

wherein the forage emplacement bin's loading opening is disposed above the peripheral frame's entrance opening such that bulk forage increments are dropped into the reciprocating piston's stroke path within the bin and the forage is delivered to the loading opening by a conveyor.

* * * * *